US010354010B2

United States Patent
Andrade Silva et al.

(10) Patent No.: US 10,354,010 B2
(45) Date of Patent: Jul. 16, 2019

(54) INFORMATION PROCESSING SYSTEM, AN INFORMATION PROCESSING METHOD AND A COMPUTER READABLE STORAGE MEDIUM

(71) Applicant: NEC Corporation, Minato-ku, Tokyo (JP)

(72) Inventors: Daniel Georg Andrade Silva, Tokyo (JP); Akihiro Tamura, Tokyo (JP); Masaaki Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/567,630

(22) PCT Filed: Apr. 24, 2015

(86) PCT No.: PCT/JP2015/002242
§ 371 (c)(1),
(2) Date: Oct. 19, 2017

(87) PCT Pub. No.: WO2016/170561
PCT Pub. Date: Oct. 27, 2016

(65) Prior Publication Data
US 2018/0137100 A1    May 17, 2018

(51) Int. Cl.
*G06F 16/33*    (2019.01)
*G06F 16/35*    (2019.01)
*G06F 17/27*    (2006.01)

(52) U.S. Cl.
CPC ...... *G06F 17/2785* (2013.01); *G06F 16/3347* (2019.01); *G06F 16/35* (2019.01); *G06F 16/353* (2019.01)

(58) Field of Classification Search
None
See application file for complete search history.

(56) References Cited

U.S. PATENT DOCUMENTS 6,161,083 A * 12/2000 Franz .................... G06F 17/271
704/4
6,847,966 B1 * 1/2005 Sommer ............. G06F 16/3347
707/739
(Continued)

FOREIGN PATENT DOCUMENTS

JP    H04-233599 A    8/1992
JP    2010-146171 A    7/2010
(Continued)

OTHER PUBLICATIONS

Nasir JA, Varlamis I, Karim A, Tsatsaronis G. Semantic smoothing for text clustering. Knowledge-Based Systems. Dec. 1, 2013;54:216-29.*

(Continued)

*Primary Examiner* — Pierre Louis Desir
*Assistant Examiner* — Jonathan C Kim

(57) ABSTRACT

An information processing system to increase weights of words that are related to a text, but that do not explicitly occur in the text, in a weight vector representing the text, is provided. An adjusting system (100) includes a distance storing unit (110) and an adjusting unit (120). The distance storing unit (110) stores distances between any two terms of a plurality of terms. The distance between two terms becomes smaller as the two terms are semantically more similar. The adjusting unit (120) adjusts a weight of each term of the plurality of terms in a weight vector including weights of the plurality of terms and representing a text, on the basis of a distance between each term and other term in the weight vector and a weight of the other term.

10 Claims, 10 Drawing Sheets

(56) References Cited

U.S. PATENT DOCUMENTS

| | | | |
|---|---|---|---|
| 7,251,637 B1* | 7/2007 | Caid | G06K 9/4623 706/15 |
| 8,650,031 B1* | 2/2014 | Mamou | G10L 15/08 704/235 |
| 8,868,590 B1* | 10/2014 | Donneau-Golencer | G06F 16/9032 707/765 |
| 9,009,146 B1* | 4/2015 | Lopatenko | G06F 16/9535 707/723 |
| 9,424,345 B1* | 8/2016 | Sanio | G06F 16/35 |
| 2003/0061200 A1* | 3/2003 | Hubert | G06Q 30/0601 |
| 2003/0140309 A1* | 7/2003 | Saito | G06F 16/345 715/259 |
| 2004/0117189 A1* | 6/2004 | Bennett | G06F 17/27 704/270.1 |
| 2004/0205448 A1* | 10/2004 | Grefenstette | G06F 16/30 715/230 |
| 2004/0243622 A1* | 12/2004 | Morisawa | G06F 16/353 |
| 2005/0033568 A1* | 2/2005 | Yu | G06F 17/276 704/10 |
| 2005/0165782 A1* | 7/2005 | Yamamoto | G06F 16/40 |
| 2006/0294060 A1* | 12/2006 | Masuyama | G06F 16/3346 |
| 2007/0073745 A1* | 3/2007 | Scott | G06F 16/374 |
| 2007/0258648 A1* | 11/2007 | Perronnin | G06K 9/00281 382/224 |
| 2008/0052273 A1* | 2/2008 | Pickens | G06F 16/3344 |
| 2010/0153187 A1* | 6/2010 | Ghani | G06Q 30/02 705/14.53 |
| 2010/0262454 A1* | 10/2010 | Sommer | G06F 16/355 706/20 |
| 2011/0270604 A1* | 11/2011 | Qi | G06F 17/271 704/9 |
| 2012/0078612 A1* | 3/2012 | Kandekar | G06F 17/2745 704/9 |
| 2012/0078918 A1* | 3/2012 | Somasundaran | G06F 17/278 707/748 |
| 2012/0096029 A1* | 4/2012 | Tamura | G06F 17/2765 707/772 |
| 2012/0166180 A1* | 6/2012 | Au | G06F 17/274 704/9 |
| 2012/0296891 A1* | 11/2012 | Rangan | G06F 16/3347 707/722 |
| 2013/0021346 A1* | 1/2013 | Terman | G09B 5/08 345/467 |
| 2014/0067368 A1* | 3/2014 | Yih | G06F 17/2785 704/9 |
| 2015/0046435 A1* | 2/2015 | Donneau-Golencer | G06F 16/9032 707/722 |
| 2015/0142807 A1* | 5/2015 | Hofmann | G06N 3/02 707/737 |
| 2015/0169580 A1* | 6/2015 | Epstein | G06F 16/951 707/749 |
| 2015/0339290 A1* | 11/2015 | Mueller | G06F 16/221 704/9 |
| 2016/0103920 A1* | 4/2016 | Lee | G06F 16/9535 707/706 |
| 2016/0335693 A1* | 11/2016 | Lin | G06Q 30/0625 |
| 2016/0350283 A1* | 12/2016 | Carus | G06F 16/36 |
| 2017/0076339 A1* | 3/2017 | Yan | G06Q 30/0282 |
| 2017/0329845 A1* | 11/2017 | Epstein | G06F 16/334 |

FOREIGN PATENT DOCUMENTS

| | | |
|---|---|---|
| JP | 2012-203472 A | 10/2012 |
| JP | 2014-170377 A | 9/2014 |
| WO | 2011/153392 A2 | 12/2011 |

OTHER PUBLICATIONS

Yoshikawa Y, Iwata T, Sawada H. Non-Linear Regression for Bag-of-Words Data via Gaussian Process Latent Variable Set Model. InAAAI Jan. 25, 2015 (pp. 3129-3135).*

Nasir JA, Varlamis I, Karim A, Tsatsaronis G. Semantic smoothing for text clustering. Knowledge-Based Systems. Dec. 1, 2013;54: 216-29. (Year: 2013).*

Yoshikawa Y, Iwata T, Sawada H. Non-Linear Regression for Bag-of-Words Data via Gaussian Process Latent Variable Set Model. InAAAI Jan. 25, 2015 (pp. 3129-3135). (Year: 2015).*

Peter D. Tumey et al., "From Frequency to Meaning: Vector Space Models of Semantics", Journal of Artificial Intelligence Research 37, pp. 141-188, 2010.

Ron Bekkerman et al., "Distributional Word Clusters vs. Words for Text Categorization", Journal of Machine Learning Research 3, pp. 1183-1208, 2003.

C. E. Rasmussen et al., "Gaussian Processes for Machine Learning", the MIT Press, 2006, 266 pages.

Google Inc. "word2vec", Tool for computing contginous distributed representations of words, [online] <https://code.google.com/p/word2vec/> , 8 pages.

Pascal Soucy et al., "Beyond TFIDF Weighting for Text Categorization in the Vector Space Model", Proceedings of the 19th International Joint Conference on Artificial Intelligence (IJCAI 2005), pp. 1130-1135, 2005.

Jamal A. Nasir et al, "Semantic smoothing for text clustering", Knowledge-based Systems 54, Dec. 1, 2013, pp. 216-229, Amsterdam, NL.

International Search Report for PCT Application No. PCT/JP2015/002242, dated Mar. 11, 2016.

English translation of Written opinion for PCT Application No. PCT/JP2015/002242.

Takao Murakami et al., "Recognition of Spoken Sequences of Japanese Isolated Vowels Based on Structural Representation of Speech", IEICE Transactions on Information and Systems, Japan, Institute of Electronics, Information and Communication Engineers, Feb. 1, 2008, A, vol. J91-A, No. 2, pp. 181-191 (11 pages total).

Communication dated Oct. 9, 2018 issued by the Japanese Patent Office in counterpart application No. 2017-552506.

* cited by examiner

Fig. 11

VOCABULARY
{"tennis", "baseball", "sports", "soccer"}

CLUSTER
{SPORT := { "tennis", "baseball", "sports", "soccer"}

INPUT TEXT 1
"After school, it is recommended that children should do some sports, like tennis or baseball. ..."

BOC REPRESENTATION : {f_SPORT := 1}

INPUT TEXT 2
"In order to play tennis one needs among other, a racket and a net. ..."

BOC REPRESENTATION : {f_SPORT := 1}

US 10,354,010 B2

INFORMATION PROCESSING SYSTEM, AN INFORMATION PROCESSING METHOD AND A COMPUTER READABLE STORAGE MEDIUM

This application is a National Stage Entry of PCT/JP2015/002242 filed on Apr. 24, 2015, the contents of all of which are incorporated herein by reference, in their entirety.

TECHNICAL FIELD

The present invention relates to an information processing system, an information processing method and a computer readable storage medium thereof.

BACKGROUND ART

A bag-of-words (BOW) representation for text documents is known as one of the most effective vector representations for text classification and clustering. In this representation, each word corresponds to one dimension in an n-dimensional weight vector, where n is the number of words in vocabulary. The i-th dimension of the weight vector represents a weight of the i-th (i=1, . . . , n) word in the vocabulary. As word weights, the number of times the word occurs in a text document (frequency count) or other weighting schemes like tf-idf (Term Frequency, Inverse Document Frequency) can be used.

However, one major drawback of the BOW representation is that it does not model semantic relationships between words. For example, a text which contains a word "park" but not a word "meadow", might actually be considered similar to a text which contains the word "meadow" but not the word "park". However, the BOW representation is not able to consider that "meadow" and "park" can be synonymous, and thus fails to detect that two texts like "I love playing soccer in the park." and "I like playing in the meadows." are similar.

One solution to this problem is to map the text representation to lower dimensional semantic space using, for example, Latent-Semantic-Indexing (LSI) or Latent Dirichlet Allocation (LDA), as described in NPL 1. However, these methods cannot make use of word similarity information that is known a-priori.

As a different solution that is able to use such word similarity information, a bag-of-clusters (BOC) representation is disclosed in NPL 2.

The BOC representation uses given word similarities to create word clusters, and then represents a text using these clusters.

FIG. 10 is a diagram illustrating an example of the BOC representation. In the example of FIG. 10, four clusters C1:={"meadows", "park"}, C2:={"soccer", "baseball"}, C3:={"play"}, and C4:={"love"} have been created for vocabulary {"love", "play", "soccer", "park", "baseball", "meadows"}. For the text "I love playing soccer in the park", a BOC representation {f_C1=1, f_C2=1, f_C3=1, f_C4=1} is generated, wherein f_Cx indicates a weight for the cluster x. For the text "I love playing baseball in the meadows", the same BOC representation is also generated. The BOC representation can be regarded as a BOW model where all words that are grouped together have the same weight, as shown in FIG. 10.

Note that, as a related technology, PTL 1 discloses a method for reducing an appearance frequency of a word for a document data based on a style to which the document data belong. PTL 2 disclosed a technology for complementing evaluation expressions missing in a sentence by using feature data of sentences including and excluding the evaluation expressions. PTL 3 discloses a method of speech recognition using continuous Makaranobis DP (Dynamic Programming).

CITATION LIST

Patent Literature

[PTL 1] Japanese Patent Application Laid-Open Publication No. 2014-170377
[PTL 2] Japanese Patent Application Laid-Open Publication No. 2010-146171
[PTL 3] Japanese Patent Application Laid-Open Publication No. H04-233599

Non-Patent Literature

[NPL 1]
P. D. Turney, P. Pantel "From Frequency to Meaning: Vector Space Models of Semantics", Journal of Artificial Intelligence Research, Vol. 37, pp. 141-188, 2010.
[NPL 2]
R. Bekkerman, R. El-Yaniv, N. Tishby, Y. Winter, "Distributional Word Clusters vs. Words for Text Categorization", Journal of Machine Learning Research, Vol. 3, pp. 1183-1208, 2003.
[NPL 3]
C. E. Rasmussen, C. K. I. Williams, "Gaussian Processes for Machine Learning", the MIT Press, 2006.
[NPL 4]
"word2vec", Google Inc., [online], [retrieved on Apr. 10, 2015], the Internet <https://code.google.com/p/word2vec/>.
[NPL 5]
P. Soucy, Guy W. Mineau, "Beyond TFIDF Weighting for Text Categorization in the Vector Space Model", Proceedings of the 19th International Joint Conference on Artificial Intelligence (IJCAI 2005), pp. 1130-1135, 2005.

SUMMARY OF INVENTION

Technical Problem

A problem of the BOC representation disclosed in NPL 2 is that, depending on the text document, the word clusters result in coarse-grained representations. Consequently, in the BOC representation, information needed for text classification and clustering may be lost.

FIG. 11 is a diagram illustrating another example of the BOC representation. In the example of FIG. 11, one cluster SPORT:={"tennis", "baseball", "sports", "soccer"} has been created. For a text "After school, it is recommended that children should do some sports, like tennis or baseball . . . .", a BOC representation suggesting that this text is about sports in general is generated. In this case, the BOC representation using the cluster SPORT is suitable. However, for another text "In order to play tennis one needs among others, a racket and a net . . . .", even though the text is about tennis rather than sports in general, the same BOC representation is generated since the word "tennis" belongs to the cluster SPORT. In this case, the information that the text is about tennis is lost.

An object of the present invention is to solve the problem mentioned above. Specifically, the object is to provide an information processing system, an information processing method and a computer readable storage medium thereof which increases weights of words that are related to a text, but that do not explicitly occur in the text.

Solution to Problem

An information processing system according to an exemplary aspect of the invention includes: a distance storing means for storing distances between any two terms of a plurality of terms, the distance between two terms becoming smaller as the two terms are semantically more similar; and an adjusting means for adjusting a weight of each term of the plurality of terms in a weight vector including weights of the plurality of terms and representing a text, on the basis of a distance between each term and other term in the weight vector and a weight of the other term.

An information processing method according to an exemplary aspect of the invention includes: reading out a distance between each term of a plurality of terms in a weight vector and other term in the weight vector from a distance storing means which stores distances between any two terms of the plurality of terms, the distance between two terms becoming smaller as the two terms are semantically more similar, the weight vector including weights of the plurality of terms and representing a text; and adjusting a weight of each term of the plurality of terms in the weight vector on the basis of the distance between each term and other term in the weight vector and a weight of the other term.

A computer readable storage medium according to an exemplary aspect of the invention records thereon a program, causing a computer to perform a method including: reading out a distance between each term of a plurality of terms in a weight vector and other term in the weight vector from a distance storing means which stores distances between any two terms of the plurality of terms, the distance between two terms becoming smaller as the two terms are semantically more similar, the weight vector including weights of the plurality of terms and representing a text; and adjusting a weight of each term of the plurality of terms in the weight vector on the basis of the distance between each term and other term in the weight vector and a weight of the other term.

Advantageous Effects of Invention

An advantageous effect of the present invention is increasing weights of words that are related to a text, but that do not explicitly occur in the text, in a weight vector representing the text.

BRIEF DESCRIPTION OF DRAWINGS

FIG. 11 is a diagram illustrating another example of the BOC representation.

DESCRIPTION OF EMBODIMENTS

First Exemplary Embodiment

A first exemplary embodiment of the present invention will be described below.

Figure 2:
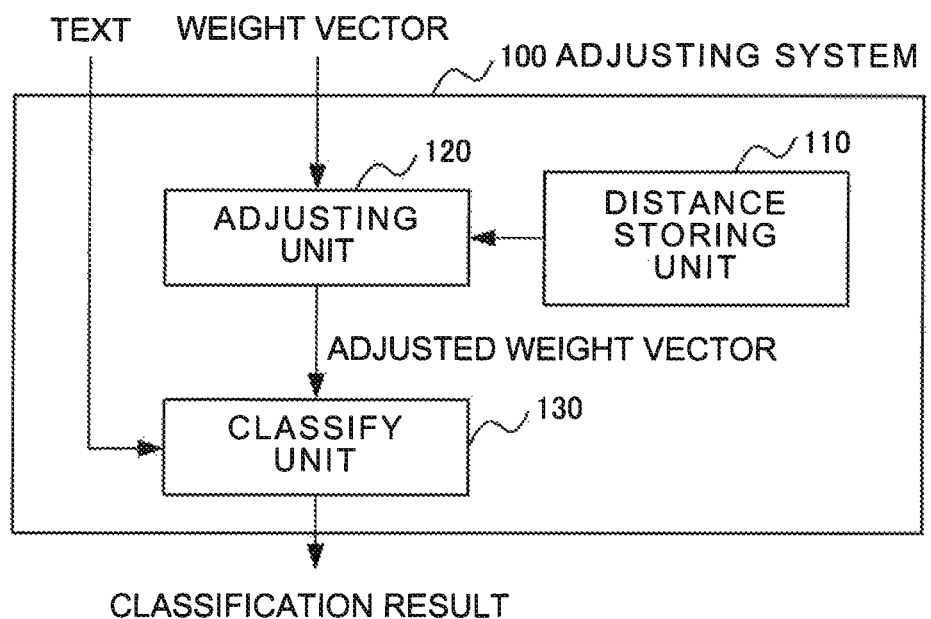
FIG. 2 is a block diagram illustrating a configuration of an adjusting system 100 in the first exemplary embodiment of the present invention.

First, a configuration of the first exemplary embodiment of the present invention will be described. FIG. 2 is a block diagram illustrating a configuration of an adjusting system 100 in the first exemplary embodiment of the present invention. The adjusting system 100 is an exemplary embodiment of an information processing system of the present invention. With reference to FIG. 2, the adjusting system 100 in the first exemplary embodiment of the present invention includes a distance storing unit 110, an adjusting unit 120, and a classify unit 130.

The distance storing unit 110 stores distances between any two words (also referred to as terms hereafter) in a plurality of words (vocabulary). Here, the distance between two words becomes smaller as the two words are semantically more similar. The distances are previously set in the distance storing unit 110 by a user, as a word similarity matrix, for example.

As a distance between two words, a Mahalanobis or any other distance between feature vectors of the two words, which represent the words, may be used. As the word feature vector, a word embedding may be used. The word embedding is calculated, for example, with word2vec described in NPL 4. In addition, as a word feature vector, a topic distribution p(topic|w) for each word may be used. The topic distribution is calculated, for example, using the Latent Dirichlet Allocation (LDA).

Alternatively, the word feature vector of a word may include information about a local-word window context and/or information about a global-context (topical context). In the case that the word feature vector includes information about the local-word window context, the distance between two words becomes smaller if the two words tend to be surrounded by the same words. In the case that the word feature vector includes information about the global-context, the distance between two words becomes smaller if the two words tend to occur in the same texts.

The adjusting unit 120 acquires a weight vector for each text to be classified. The weight vector corresponds to the BOW mentioned above and represents the text. The weight vector includes weights of the plurality of words (vocabulary).

The adjusting unit 120 adjusts a weight of each word of the plurality of words (vocabulary) in the weight vector, on the basis of a distance between each word and other word in the weight vector and a weight of the other word. Here, the adjusting unit 120 adjusts a weight of each word in such a way that the weight is increased when the distance between each word and other word is smaller and the weight of the other word is larger, for example.

The classify unit 130 performs text classification using the adjusted weight vector (adjusted BOW representation).

Figure 3:
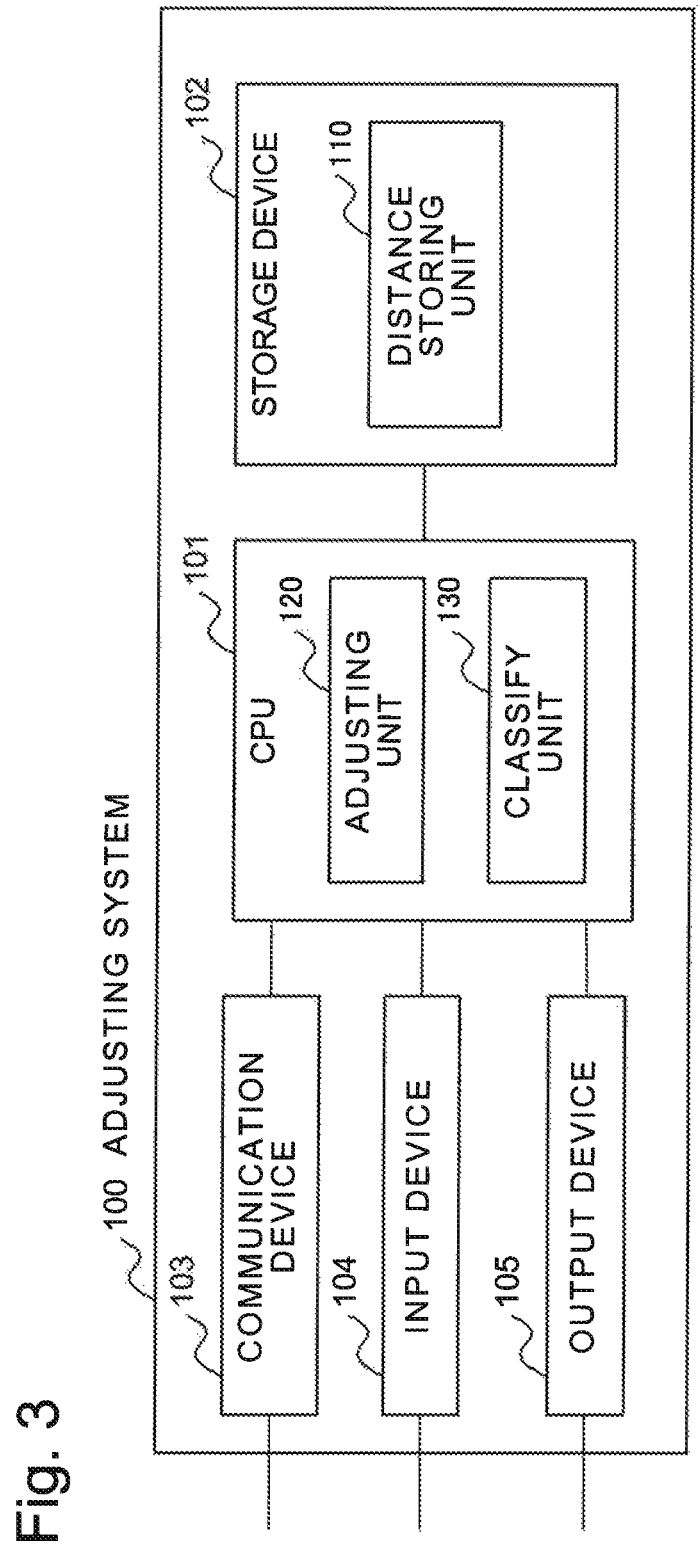
FIG. 3 is a block diagram illustrating a configuration of the adjusting system 100 in the first exemplary embodiment of the present invention, in the case that the adjusting system 100 is implemented on a computer.

Note that the adjusting system 100 may be a computer which includes a central processing unit (CPU) and a storage medium storing a program and which operates according to the program-based control. FIG. 3 is a block diagram illustrating a configuration of the adjusting system 100 in the first exemplary embodiment of the present invention, in the case that the adjusting system 100 is implemented on a computer.

With reference to FIG. 3, the adjusting system 100 includes a CPU 101, a storage device 102 (storage medium), a communication device 103, an input device 104 such as a keyboard, and an output device 105 such as a display. The CPU 101 executes a computer program to implement the functions of the adjusting unit 120 and the classify unit 130. The storage device 102 stores information in the distance storing unit 110. The communication device 103 may receive a text and a weight vector for the text from another device and send a result of text classification for the text to the device. The input device 104 may receive an instruction of text classification from a user. The output device 105 may output (display) a result of the text classification to the user.

Alternatively, each of the units in the adjusting system 100 may be implemented on an individual logical circuit. The units in the adjusting system 100 may be allocated respectively to a plurality of devices interconnected with wired or wireless channels.

Next, operations of the adjusting system 100 according to the first exemplary embodiment of the present invention will be described.

Figure 4:
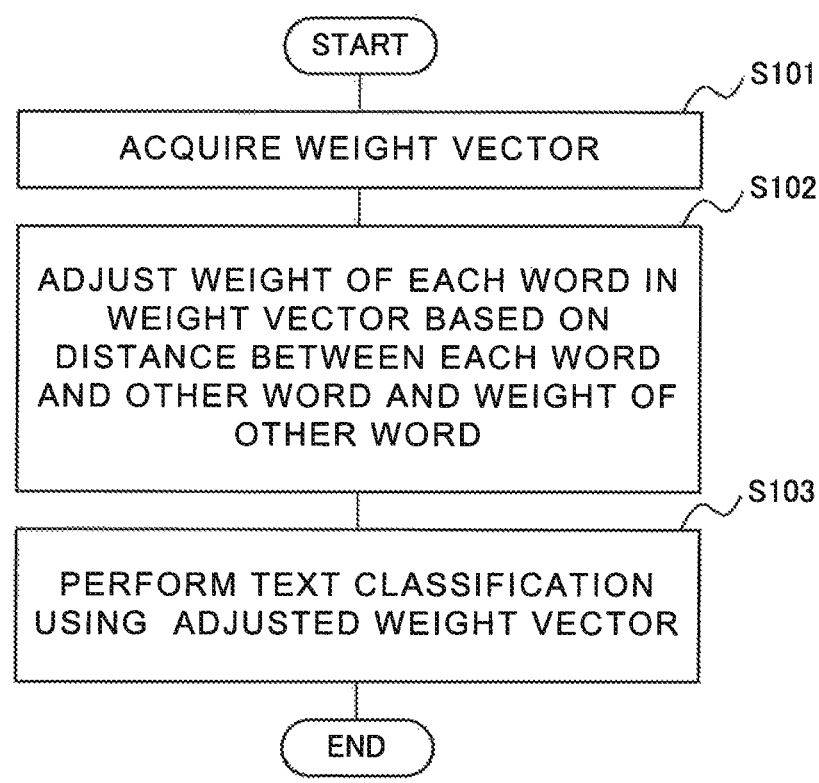
FIG. 4 is a flowchart illustrating a process of the adjusting system 100 in the first exemplary embodiment of the present invention.

FIG. 4 is a flowchart illustrating a process of the adjusting system 100 in the first exemplary embodiment of the present invention. The adjusting unit 120 acquires a weight vector for a text to be classified (Step S101). The adjusting unit 120 reads out a distance between each word and other word in the weight vector from the distance storing unit 110, and adjusts a weight of each word in the weight vector on the basis of the distance between each word and other word and a weight of the other word (Step S102). The classify unit 130 performs text classification using the adjusted weight vector (Step S103).

Figure 5:
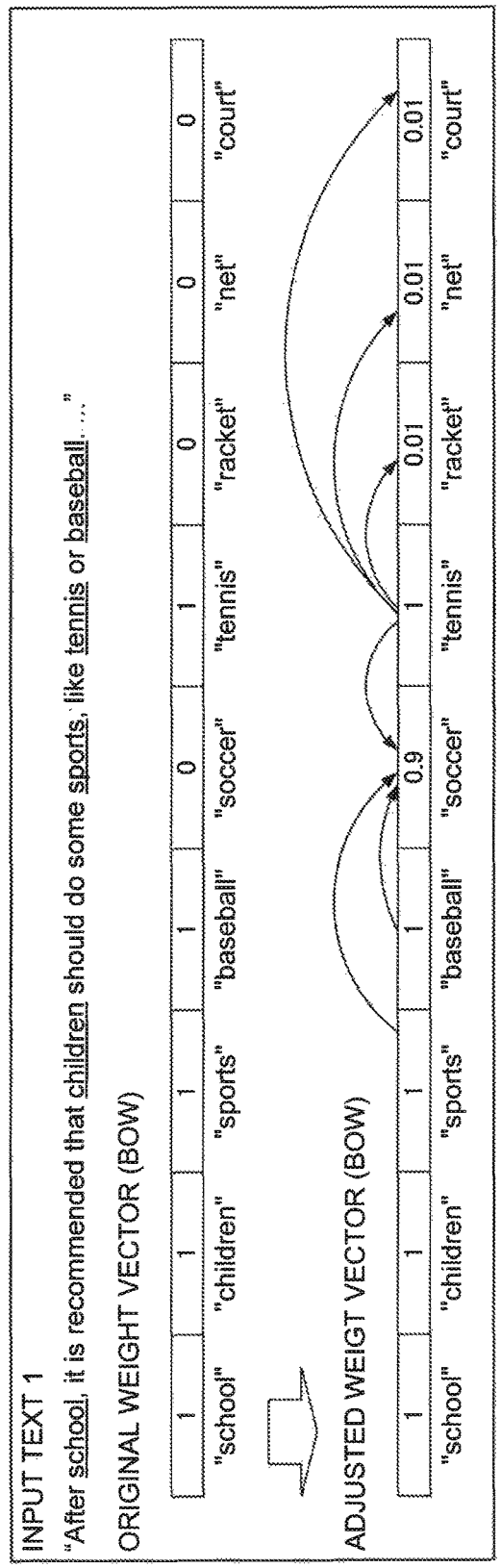
FIG. 5 is a diagram illustrating an example of adjustment of a weight in the first exemplary embodiment of the present invention.

FIG. 5 is a diagram illustrating an example of the adjustment of a weight in the first exemplary embodiment of the present invention. For example, the adjusting unit 120 acquires an original weight vector shown in FIG. 5 for a text "After school, it is recommended that children should do some sports, like tennis or baseball . . . .". In the original weight vector, zero is set to weights of the words "soccer", "racket", "net", and "court" since these words do not occur in the text. Here, it is assumed that the words "sports", "baseball", "soccer" and "tennis" are close to (semantically similar to) each other, and the words "tennis", "racket", "net", and "court" are also close to each other. In this case, the weight of the word "soccer" is increased to "0.9" since the word is close to three words ("sports", "baseball", and "tennis") having a weight "1". In contrast, the weights of the words "racket", "net", and "court" stay close to zero since these words are close to only one word ("tennis") having a weight "1".

Figure 6:
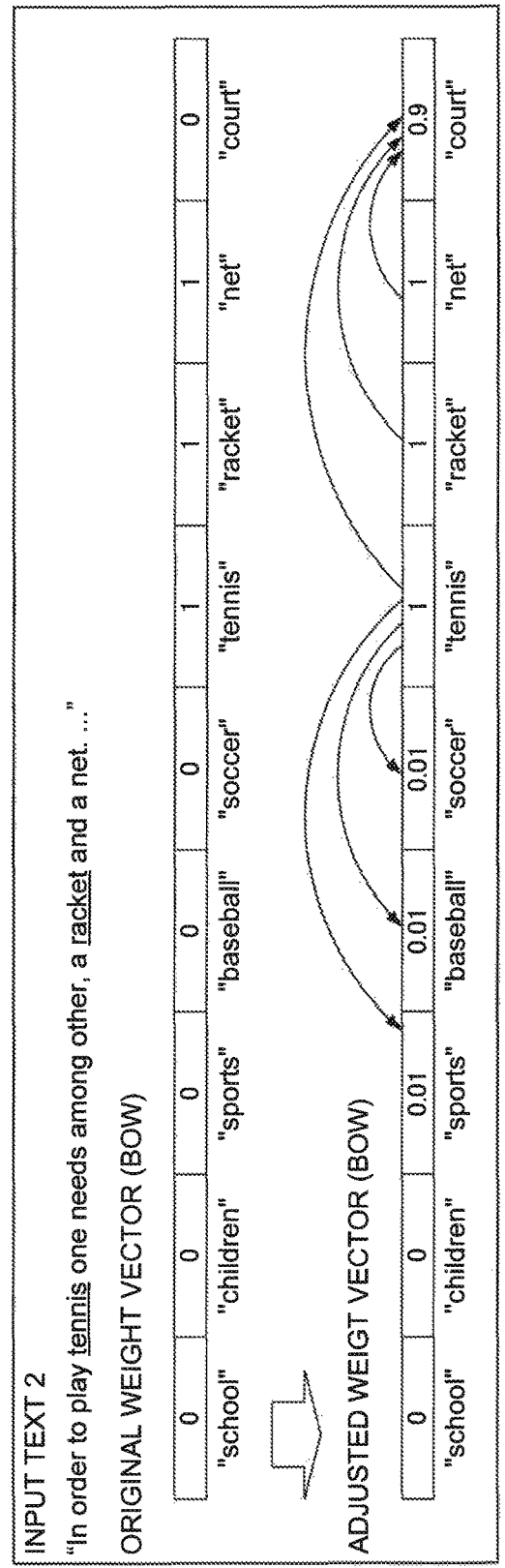
FIG. 6 is a diagram illustrating another example of the adjustment of a weight in the first exemplary embodiment of the present invention.

FIG. 6 is a diagram illustrating another example of the adjustment of a weight in the first exemplary embodiment of the present invention. For example, the adjusting unit 120 acquires another original weight vector shown in FIG. 6 for a text "In order to play tennis one needs among other, a racket and a net . . . .". In the original weight vector, zero is set to weights of the words "school", "children", "sports", "baseball", "soccer", and "court" since these words do not occur in the text. In this case, the weight of the word "court" is increased to "0.9" since the word is close to three words ("tennis", "racket", and "net") having a weight "1". In contrast, the weights of the words "sports", "baseball", and "soccer" stay close to zero since these words are close to only one word ("tennis") having a weight "1".

In this way, the weight in FIG. 5 is adjusted in such a way that a weight of word related to sports is increased, and the weight vector in FIG. 6 is adjusted in such a way that a weight of word related to tennis is increased.

By using the adjusted weight vectors (adjusted BOW representation), the classify unit 130 is possible to obtain accurate classification results for these texts.

Next, a characteristic configuration of the first exemplary embodiment of the present invention will be described.

Figure 1:
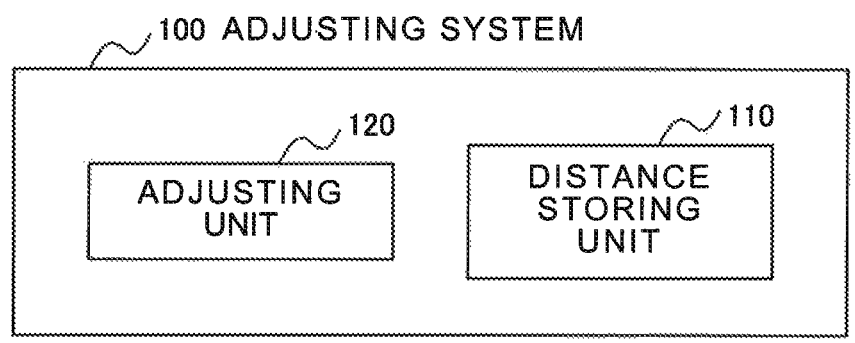
FIG. 1 is a block diagram illustrating a characteristic configuration of a first exemplary embodiment of the present invention.

FIG. 1 is a block diagram illustrating a characteristic configuration of the first exemplary embodiment of the present invention.

With reference to FIG. 1, an adjusting system 100 (an information processing system) includes a distance storing unit 110 and an adjusting unit 120. The distance storing unit 110 stores distances between any two words of a plurality of words. The distance between two words becomes smaller as the two words are semantically more similar. The adjusting unit 120 adjusts a weight of each word of the plurality of words in a weight vector including weights of the plurality of words and representing a text, on the basis of a distance between each word and other word in the weight vector and a weight of the other word.

According to the first exemplary embodiment of the present invention, it is possible to increase weights of words that are related to a text, but that do not explicitly occur in the text, in a weight vector representing the text. This is because the adjusting unit 120 adjusts a weight of each word in a weight vector for a text, on the basis of a distance between each word and other word and a weight of the other word. It achieves a richer BOW representation of a text that contains more semantic information with less zero entries. As a consequence, the rich BOW representation helps text classification and clustering, among others.

Second Exemplary Embodiment

A second exemplary embodiment of the present invention will be described below. In the second exemplary embodiment of the present invention, it is assumed that real but unobserved weights of words are latent variables which are distributed by noise, and the weight vector is adjusted (estimated) based on a noise model.

The distance storing unit 110 stores distance $r_{i,j}$ between each pair of the i-th (i=1, . . . , n) word and j-th (j=1, . . . , n) word.

The adjusting unit 120 calculates a covariance matrix for all words from the distances between words stored in the distance storing unit 110. The covariance matrix contains all information about the correlation between any two words.

The adjusting unit 120 uses the covariance matrix to adjust the word weights. It is assumed that the true, but unobserved (latent) true word weights have been generated from a multivariate Gaussian with the covariance matrix. However, the true weights are disrupted by some noise. The disrupted word weights are actually observed as word weights of an input weight vector.

As the noise, two types of noise, additive and multiplicative, are mainly considered.

First, the adjustment of word weights assuming the additive noise is explained. In the following, a function f maps a word feature vector of the i-th word $e_i$ (i=1, ..., n) to a weight $f(e_i)$. The weight $f(e_i)$ is also referred to as $f_i$ (i=1, ..., n). Here, it is assumed that the function f is distributed according to a Gaussian Process (GP) with a fixed mean $m_i$ (i=1, ..., n) and a covariance function $k(e_i, e_j)$.

As the covariance function, a squared exponential covariance function expressed by Math. 1 can be used, for example.

$$k(e_i, e_j) = \exp\left(-\frac{1}{2l^2} \cdot r_{i,j}^2\right) \quad \text{[Math. 1]}$$

where l is a characteristic length scale described in NPL 3, and the distance $r_{i,j}$ is defined by Math. 2.

$$r_{i,j} := \|e_i - e_j\| \quad \text{[Math. 2]}$$

The above choice of the covariance function achieves that two similar words have similar word weights. To see this, consider that $k(e_i, e_j)$ equals the covariance $E[(f(e_i)-m)(f(e_j)-m)]$, and assume that, for similar words, the corresponding word feature vectors are similar and thus the distance $r_{i,j}$ is small. As a consequence, $k(e_i, e_j)$ is large.

Furthermore, it is assumed that the true, but unobserved word weights $f_i$ are disturbed by isotropic Gaussian noise, leading to the observed word weights $y_i$ (i=1, ..., n). The generative model can be expressed by Math. 3.

1. Sample f from a GP $$f \sim GP(m, k(e_i, e_j))$$

2. Add isotropic noise $$y_i = f(e_i) + \varepsilon \quad \text{[Math. 3]}$$

where the noise $\varepsilon$ is sampled from the isotropic Gaussian noise with zero mean and variance $\sigma^2$, $N(0, \sigma^2)$.

Given a text with word weights $y_i$, the true word weights $f_i$ can be estimated with a MAP (maximum-a-posteriori) estimate expressed by Math. 4.

$$\underset{f_i}{\operatorname{argmax}}\, p(f_i \mid y_1, \ldots, y_n) \quad \text{[Math. 4]}$$

Referring to NPL 3, it is easy to show that $p(f_i|y_1, \ldots, y_n)$ is a Gaussian distribution with a mode expressed by Math. 5.

$$\underset{f_i}{\operatorname{argmax}}\, p(f_i \mid y_1, \ldots, y_n) = m_i + K_i^T (K + \sigma^2 I)^{-1} (y - m) \quad \text{[Math. 5]}$$

where m (m is an n dimensional vector) is the mean of the GP to which an empirical mean weight of all word weights in the text expressed by math. 6 is set for all i (i=1, ..., n). Note that $m_i$ contains the same value for each i.

$$m_i = \frac{1}{n} \sum_{j=1}^{n} y_j \quad \text{[Math. 6]}$$

The vector y (y is an n dimensional vector) contains the observed word weights $y_i$, ..., $y_n$. The co-variance matrix K (K is an n×n dimensional matrix with an element $K_{i,j}$ (i=1, ..., n, j=1, ..., n)) is defined by math. 7.

$$K_{i,j} = k(e_i, e_j) \quad \text{[Math. 7]}$$

The vector $K_i$ ($K_i$ is an n dimensional vector, i=1, ..., n) denotes the i-th column vector of the matrix K.

The adjusting unit 120 estimates the latent word weights with Math. 5 to obtain the adjusted word weights.

The smoothing vector $K_i(K+\sigma^2 I)^{-1}$ in Math. 5 is constant for all texts and therefore can be calculated in advance. The variance $\sigma^2$ can be set to a predetermined constant value, like 1.0 or 2.0. Alternatively, the variance $\sigma^2$ can also be determined using cross-validation or maximizing a marginal likelihood of training data.

Note that, for the observed word weight $y_i$, there are several choices. For example, for text classification, as a word weight, tf-idf or a supervised weight like ConfWeight as defined in NPL 5 can be used.

Here, concrete examples using the texts shown in FIG. 5 and FIG. 6 will be explained.

Figure 7:
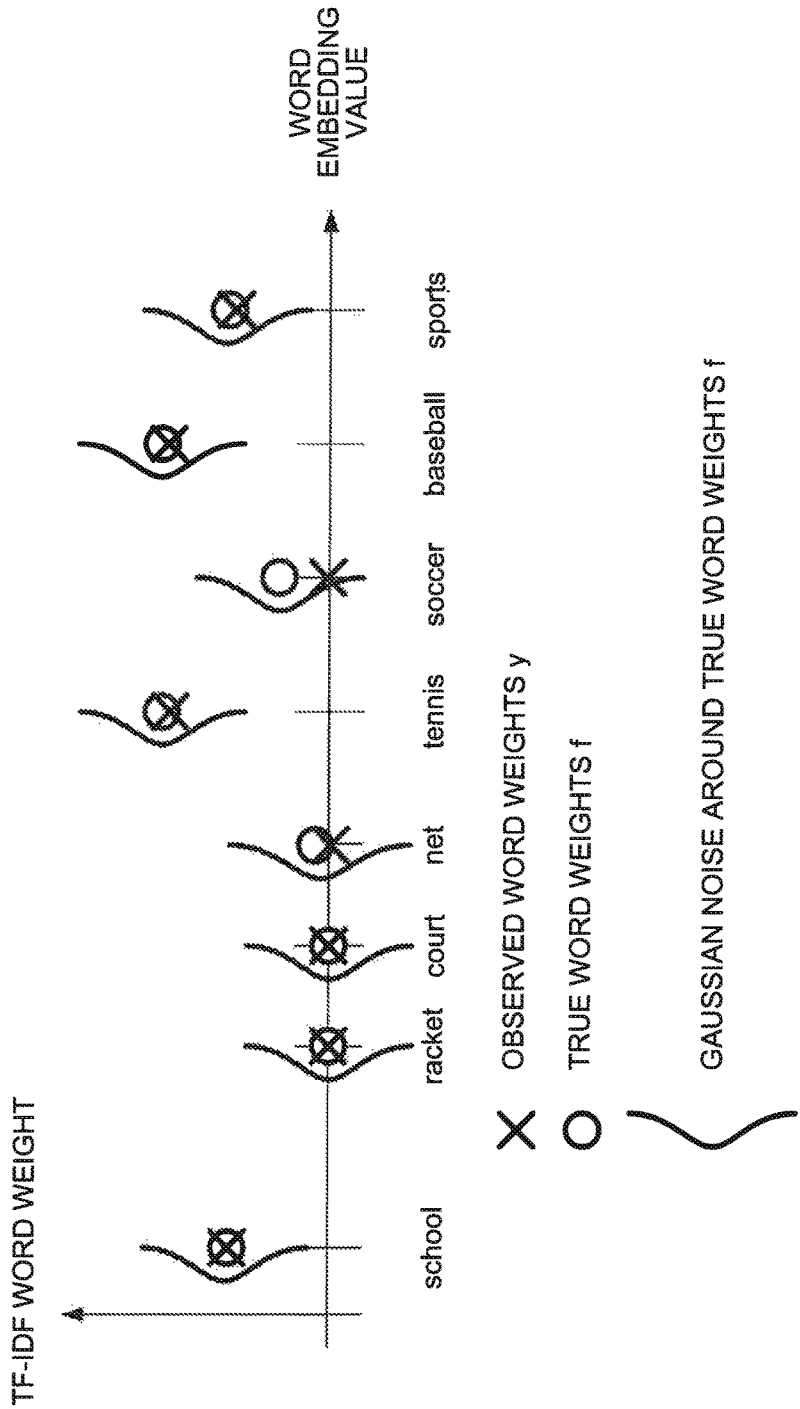
FIG. 7 is a diagram illustrating an example of tf-idf word weights in a second exemplary embodiment of the present invention.

FIG. 7 is a diagram illustrating an example of tf-idf word weights in the second exemplary embodiment of the present invention. For illustration purposes, it is assumed that a word feature vector (word embedding) has only one dimension. Values of the word embeddings (one dimensional values) are shown in the horizontal axis, and values of the tf-idf word weights (the observed weights and the underlying (unobserved) true weights) are shown in the vertical axis.

In the example of FIG. 7, the words "tennis", "school", "baseball", and "sport", that occur in the text, have high observed word weights. The words "soccer", "racket", "net", and "court", that do not occur in the text, have zero observed word weights. The word feature vector of the word "tennis" is close to the feature vectors of the other related words like "court", "net" and "soccer". Since, the word "soccer" is close to the words "tennis" and "baseball" both of which have high observed word weights, the estimate for the true word weight of the word "soccer" is higher than the observed word weight, as shown in FIG. 7.

Figure 8:
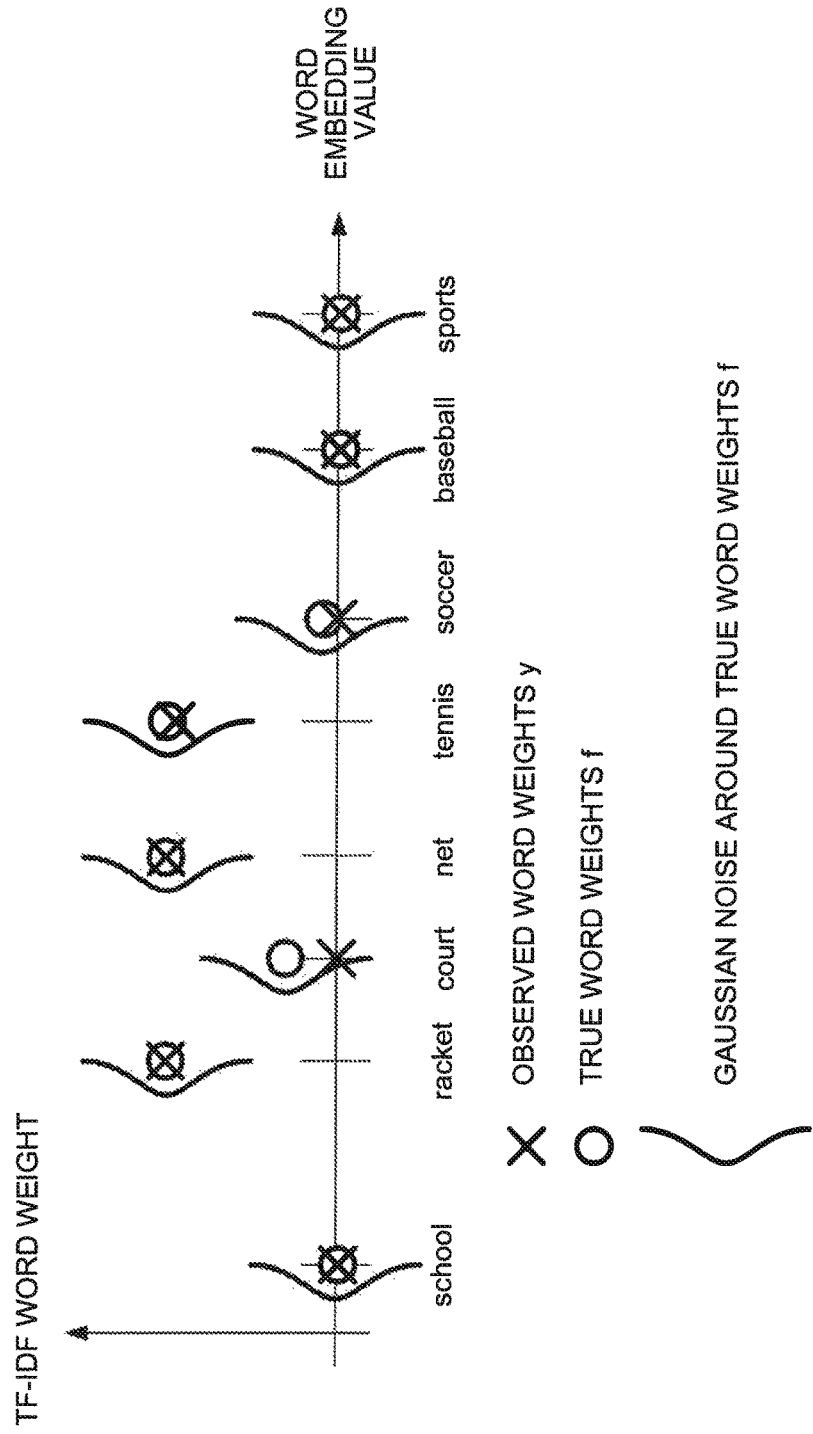
FIG. 8 is a diagram illustrating another example of tf-idf word weights in the second exemplary embodiment of the present invention.

FIG. 8 is a diagram illustrating another example of tf-idf word weights in the second exemplary embodiment of the present invention.

In the example of FIG. 8, the words "tennis", "racket", and "net", that occur in the text, have high observed word weights. The words "school", "sports", "baseball", "soccer", and "court", that do not occur in the text, have zero observed word weights. In this example, since the word "baseball" has zero observed weight, the estimate for the true word weight of the word "soccer" is only slightly higher than the observed word weight, as shown in FIG. 8. In contrast, the word "court" is close to the words "tennis", "net", and "racket" which have high observed weights. As a consequence, the estimate for the true word weight of the word "court" is considerably higher than the observed word weight.

Next, the adjustment of word weights assuming the multiplicative noise is explained. In this case, the observed word weights $y_i$ can be expressed by Math. 8.

$$y_i = 1_\theta(f_i) \cdot f_i \quad \text{[Math. 8]}$$

where the noise $1_\theta(f_i)$ is 1 with probability proportional to $f_i$, and otherwise 0. This model explicitly explains the typically sparse BOW representation of texts. It is assumed that the function f is distributed according to multivariate normal distribution with mean weight vector m, and covariance matrix K, as expressed by Math. 9.

$$f \sim N(m,K) \qquad \text{[Math. 9]}$$

Although there is no analytic solution to find the MAP estimate of $f_i$, Gibbs sampling can be used to find an approximation of $f_i$, for example.

According to the second exemplary embodiment of the present invention, it is also possible to increase weights of words that are related to a text in a weight vector. This is because the adjusting unit 120 adjusts a weight of each word in the weight vector by calculating a covariance matrix from the distances between words and estimating a latent weight of each word based on the calculated covariance matrix and a noise model.

Third Exemplary Embodiment

A third exemplary embodiment of the present invention will be described below. In the third exemplary embodiment of the present invention, distances between words are calculated from word feature vectors.

Figure 9:
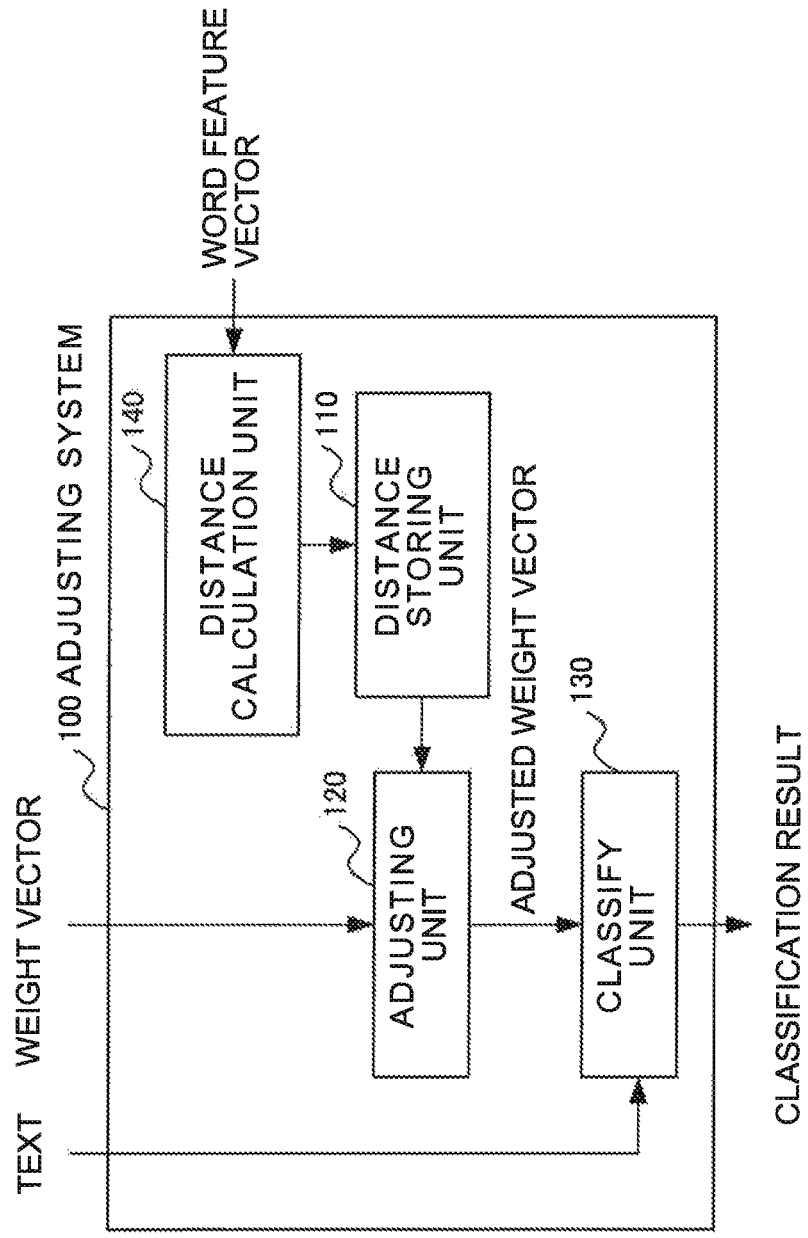
FIG. 9 is a block diagram illustrating a configuration of an adjusting system 100 in a third exemplary embodiment of the present invention.
Figure 10:
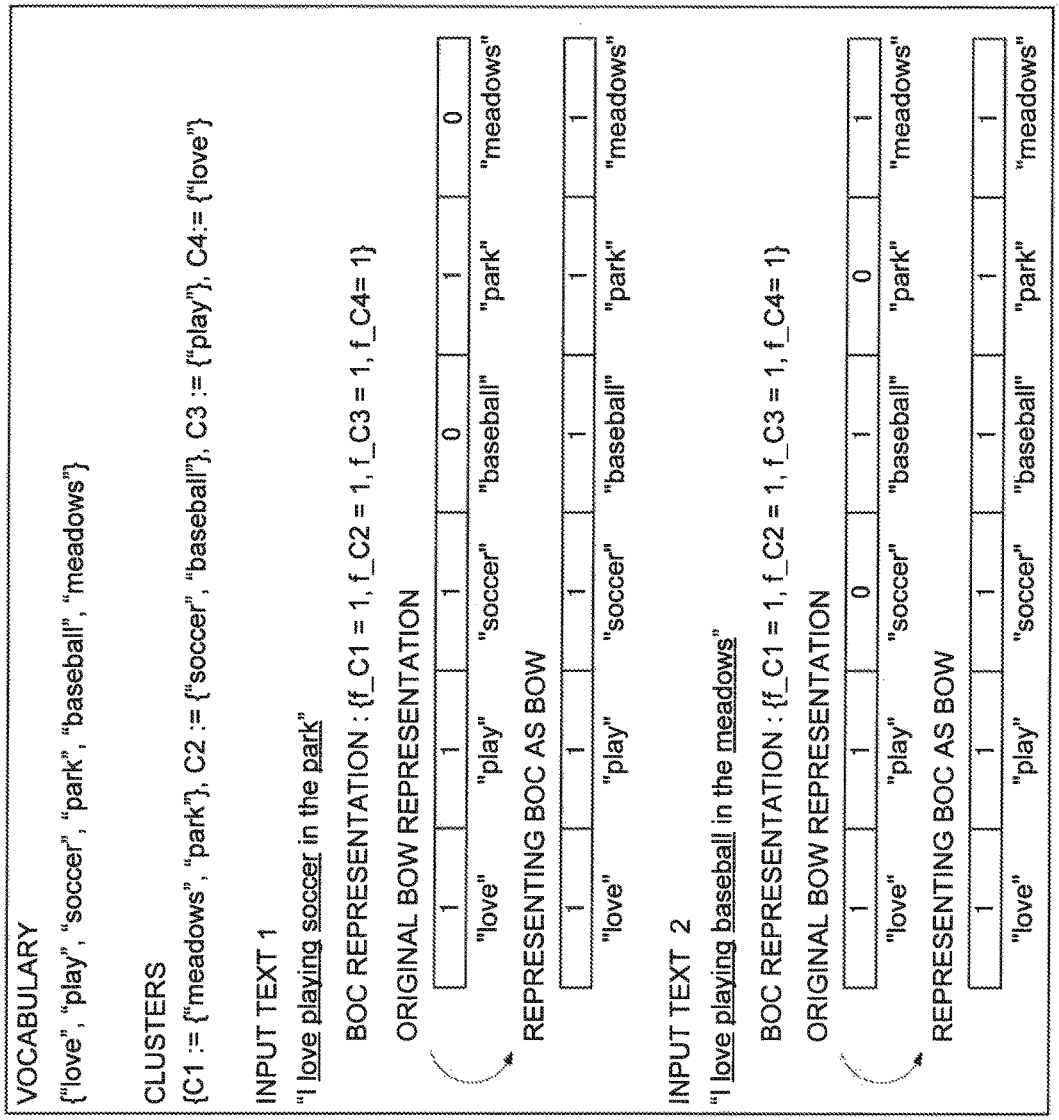
FIG. 10 is a diagram illustrating an example of a BOC representation.

FIG. 9 is a block diagram illustrating a configuration of an adjusting system 100 in the third exemplary embodiment of the present invention. With reference to FIG. 9, the adjusting system 100 in the third exemplary embodiment of the present invention further includes a distance calculation unit 140. The distance calculation unit 140 calculates distances between words from word feature vectors, and stores the calculated distances into the distance storing unit 110.

In the third exemplary embodiment of the present invention, the distance $r_{i,j}$ is defined by Math. 10.

$$r_{i,j} := \alpha_{i,j} \sqrt{(e_i - e_j)^T B (e_i - e_j)} \qquad \text{[Math. 10]}$$

where B is an n×n dimensional feature weighting matrix, and $\alpha_{i,j}$ is a factor to correct the distance between the i-th word and the j-th word for class-specificity.

First, the feature weighting matrix B is explained.

In its easiest setting, the feature weighting matrix B is simply set to an identity matrix.

As described above, as a word feature vector, a word embedding or topic distribution may be used, for example. Alternatively, both of the word embedding and the topic distribution may also be combined to a $(d_1+d_2)$ dimensional feature vector e, where $d_1$ and $d_2$ are the dimension of the word embedding and the number of topics, respectively. If, for example, the word embedding information is more important than the topic distribution, then it is beneficial to additionally specify an appropriate matrix B. In this case, the matrix may be learned using cross-validation or by maximizing the likelihood of the training data, as described in NPL 3.

Next, the correction factor $\alpha_{i,j}$ is explained.

Even if local or topical context of two words is quite similar, the two words might tend to occur in different classes. In that case their semantic similarity should be small. In the third exemplary embodiment of the present invention, it is assumed that some texts have been assigned to classes. This is in particular the case if the final representation (weight vector) for the text is used for classification. For example, if the final task is to classify texts as either being about "sport" or being about "politics", it is possible to assume having a training data set of texts with the assigned classes.

The distance between two words assigned to classes is corrected by using correlation between the two words and the assigned classes. For simplicity, assume there are only two classes A and B. In this case, the correlation coefficient $\rho_{A,i}$, that is a correlation coefficient between class A and the i-th word, ranging from −1 to 1, is calculated. The correction factor $\alpha_{i,j}$ is expressed by Math. 11, using the correlation coefficient $\rho_{A,i}$ and $\rho_{A,j}$.

$$\alpha_{i,j} := \frac{1 - \rho_{A,i} \cdot \rho_{A,j}}{2} \qquad \text{[Math. 11]}$$

For example, for the correlation coefficient $\rho_{A,i}$, a Pearson's correlation coefficient can be used. Let denote a random variable indicating whether a text belongs to class A by A, and a random variable indicating whether the i-th word occurs (one or more times) in the text by i. Let denote the number of labeled training data by $N_l$. Furthermore, let denote a variable which indicates whether a text t belongs to class A or not by $A_t$ ($A_t$ is 0 or 1). Analogously, let denote a variable which indicates whether the i-th word occurs (one or more times) in the text t or not by $i_t$ ($i_t$ is 0 or 1). In this case, the correlation coefficient $\rho_{A,i}$ can be expressed by Math. 12.

$$\rho_{A,i} = \frac{conv(A, i)}{\sqrt{var(A) var(i)}} \qquad \text{[Math. 12]}$$

$$\approx \frac{\sum_{t=1}^{N_l} (A_t - \overline{A}_t)(i_t - \overline{i}_t)}{\sqrt{\sum_{t=1}^{N_l} (A_t - \overline{A}_t)^2} \sqrt{\sum_{t=1}^{N_l} (i_t - \overline{i}_t)^2}}$$

$\overline{A}_t$: sample mean of $A_t$
$\overline{i}_t$: sample mean of $i_t$

The distance calculation unit 140 calculates the distances between words using Math. 10, Math. 11, and Math. 12.

According to the third exemplary embodiment of the present invention, it is possible to obtain more accurate classification results using the weight vectors adjusted based on distances between words. This is because the distance calculation unit 140 corrects distances in such a way that the distance between two words becomes smaller if the two words tend to occur in texts that belong to the same class.

Fourth Exemplary Embodiment

A fourth exemplary embodiment of the present invention will be described below. In the fourth exemplary embodiment of the present invention, an approximation of the Gaussian process (GP) model described in the second exemplary is used.

Calculating the inverse of the matrix $(K+\sigma^2 I)$ shown in the second exemplary becomes infeasible for $n>10^4$. However, in practice, the size of vocabulary is often much larger, at around $10^5$ or more words. In the fourth exemplary embodiment, words $w_1, \ldots, w_s$ (s is smaller enough compared with n) are chosen from the vocabulary such that the covariance $k(e_i, e_w)$ is maximal, for fixed i and words w in the vocabulary, and the approximation expressed by Math. 13 is used.

$$p(f_i|y_1,\ldots,y_n) \approx p(f_i|y_{w_q},\ldots,y_{w_s}) \quad [\text{Math. 13}]$$

The words w in the vocabulary are sorted by a distance ($|e_i-e_w|$) between the i-th word and each word w, and top s words are taken. Let denote the taken words $w_1, \ldots, w_s$ (a subset of the vocabulary for the i-th word) by sub(i), and the vectors and matrices restricted to the words sub(i) by $y_{sub(i)}$, $m_{sub(i)}$, $K_{i,sub(i)}$, and $K_{sub(i)}$. The approximation can be expressed by Math. 14.

$$\arg\max_{f_i} p(f_i | y_{w_q}, \ldots, y_{w_s}) = \quad [\text{Math. 14}]$$
$$m_i + K_{i,sub(i)}^T (K_{sub(i)} + \sigma^2 I)^{-1} (y_{sub(i)} - m_{sub(i)})$$

By using $b_i^T$ defined in Math. 15, the approximation can be expressed as Math. 16.

$$b_i^T := K_{i,sub(i)}^T (K_{sub(i)} + \sigma^2 I)^{-1} \quad [\text{Math. 15}]$$

$$\arg\max_{f_i} p(f_i | y_{w_q}, \ldots, y_{w_s}) = m_i + b_i^T (y_{sub(i)} - m_{sub(i)}) \quad [\text{Math. 16}]$$

Note that computational expensive calculation of $b_i^T$ can be done in advance during training phase. Furthermore, instead of calculating the inverse of the matrix $(K_{sub(i)}+\sigma^2 I)$, Cholesky decomposition may be used. In this case, the matrix $(K_{sub(i)}+\sigma^2 I)$ is decomposed as $K_{sub(i)}+\sigma^2 I=LL^T$, where L is a Cholesky factor, and a linear equation $LL^T b_i^T = K_{i,sub(i)}$ can be solved by back substitution. Using the Cholesky decomposition is in general faster and numerically more stable than calculating the inverse as shown in NPL 3.

The adjusting unit 120 adjusts a weight of each word in the weight vector according to Math. 16.

Note that, for training, by using the approximation, the computational complexity drops from $O(n^3)$ to $O(ns^3)$ and the space complexity drops from $O(n^2)$ to $O(s^2)$. Also for testing, i.e. for calculating $f_1, \ldots, f_n$ for a new text given $y_i, \ldots, y_n$, the computational complexity drops from $O(n^2)$ to $O(s^2)$.

According to the fourth exemplary embodiment of the present invention, it is possible to reduce computational complexity for adjusting weights of words. This is because the adjusting unit 120 adjusts a weight of each word in the weight vector by using the covariance matrix restricted to a subset of words closed to the word for which the weight is adjusted.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to a text classification or clustering system. In particular, the present invention allows to detect that two texts are similar even if they are semantically similar but have only few words in common. Therefore, if the text to be classified is small like Tweets, the present invention allows high text classification accuracy.

REFERENCE SIGNS LIST 100 adjusting system
101 CPU
102 storage device
103 communication device
104 input device
105 output device
110 distance storing unit
120 adjusting unit
130 classify unit
140 distance calculation unit

What is claimed is:

1. An information processing system comprising:
a memory storing instructions; and
one or more processors configured to execute the instructions to:
store distances between any two terms of a plurality of terms, the wherein a distance of the stored distances becomes smaller as two terms are semantically more similar and if the two terms tend to occur in texts that belong to a same class;
adjust a weight of each term of the plurality of terms in a weight vector including weights of the plurality of terms and representing a text, on the basis of distances between each term and other terms in the weight vector and weights of the other terms; and
classify the text using the adjusted weight of each term of the plurality of terms in the weight vector,
wherein the weight of each term in the weight vector is adjusted by estimating a latent weight of each term of the plurality of terms in the weight vector by a MAP (maximum-a-posteriori) estimate with a posterior probability of the latent weight when observed weights of the plurality of terms in the weight vector are given, assuming the observed weights are generated from latent weights with Gaussian noise, and
wherein the posterior probability is approximated with a subset of the observed weights of the plurality of terms, wherein the subset corresponds to a subset of the plurality of terms in the weight vector selected based on the distances between each term and the other terms.

2. The information processing system according to claim 1, wherein
the one or more processors configured to further execute the instructions to:
calculate the distances between any two terms of the plurality of terms on the basis of a distance between feature vectors of the two terms, the feature vector including at least one of information about a local-word window context and information about a topical context.

3. The information processing system according to claim 2, wherein
the distances are corrected in such a way that the distance between two terms becomes smaller if the two terms tend to occur in texts that belong to the same class.

4. The information processing system according to claim 1, wherein
the weight of each term in the weight vector is adjusted by calculating a covariance matrix for the plurality of terms from the distances between each term and the other terms, and estimating the latent weight of each term of the plurality of terms from the weight vector on the basis of the MAP estimate using the calculated covariance matrix.

5. The information processing system according to claim 4, wherein
the latent weight of each term of the plurality of terms is estimated using the calculated covariance matrix restricted to the subset of the plurality of terms, wherein distances between each term and the subset of the plurality of terms are smaller than a distance between each term and a term not in the subset.

6. An information processing method comprising:
reading out distances between each term of a plurality of terms in a weight vector and other terms in the weight vector from a distance storage which stores distances between any two terms of the plurality of terms, wherein a distance of the stored distances becomes smaller as two terms are semantically more similar and if the two terms tend to occur in texts that belong to a same class, the weight vector including weights of the plurality of terms and representing a text;
adjusting a weight of each term of the plurality of terms in the weight vector on the basis of the distances between each term and other terms in the weight vector and weights of the other terms; and
classifying the text using the adjusted weight of each term of the plurality of terms in the weight vector,
wherein the weight of each term in the weight vector is adjusted by estimating a latent weight of each term of the plurality of terms in the weight vector by a MAP (maximum-a-posteriori) estimate with a posterior probability of the latent weight when observed weights of the plurality of terms in the weight vector are given, assuming the observed weights are generated from latent weights with Gaussian noise, and
wherein the posterior probability is approximated with a subset of the observed weights of the plurality of terms, wherein the subset corresponds to a subset of the plurality of terms in the weight vector selected based on the distances between each term and the other terms.

7. The information processing method according to claim 6, further comprising calculating the distances between any two terms of the plurality of terms on the basis of a distance between feature vectors of the two terms, the feature vector including at least one of information about a local-word window context and information about a topical context.

8. The information processing method according to claim 7, wherein,
the calculating corrects the distances in such a way that the distance between two terms becomes smaller if the two terms tend to occur in texts that belong to the same class.

9. The information processing method according to claim 6,
wherein the adjusting adjusts the weight of each term in the weight vector by calculating a covariance matrix for the plurality of terms from the distances between each term and the other terms, and estimating the latent weight of each term of the plurality of terms from the weight vector on the basis of the MAP estimate using the calculated covariance matrix.

10. A non-transitory computer readable storage medium recording thereon a program, causing a computer to perform a method comprising:
reading out distances between each term of a plurality of terms in a weight vector and other term terms in the weight vector from a distance storage which stores distances between any two terms of the plurality of terms, wherein a distance of the stored distances becomes smaller as two terms are semantically more similar and if the two terms tend to occur in texts that belong to a same class, the weight vector including weights of the plurality of terms and representing a text;
adjusting a weight of each term of the plurality of terms in the weight vector on the basis of the distances between each term and other terms in the weight vector and weights of the other terms; and
classifying the text using the adjusted weight of each term of the plurality of terms in the weight vector,
wherein the weight of each term in the weight vector is adjusted by estimating a latent weight of each term of the plurality of terms in the weight vector by a MAP (maximum-a-posteriori) estimate with a posterior probability of the latent weight when observed weights of the plurality of terms in the weight vector are given, assuming the observed weights are generated from latent weights with Gaussian noise, and
wherein the posterior probability is approximated with a subset of the observed weights of the plurality of terms, wherein the subset corresponds to a subset of the plurality of terms in the weight vector selected based on the distances between each term and the other terms.

* * * * *